United States Patent
Goi et al.

(10) Patent No.: US 10,562,984 B2
(45) Date of Patent: *Feb. 18, 2020

(54) CRUDE OIL RECOVERY ADDITIVE

(71) Applicant: DAI-ICHI KOGYO SEIYAKU CO., LTD., Kyoto-shi, Kyoto (JP)

(72) Inventors: Yousuke Goi, Kyoto (JP); Mineo Sabi, Kyoto (JP); Kazuhito Jinno, Kyoto (JP); Koji Noda, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 185 days.

This patent is subject to a terminal disclaimer.

(21) Appl. No.: 14/912,562

(22) PCT Filed: Aug. 26, 2014

(86) PCT No.: PCT/JP2014/072211
§ 371 (c)(1),
(2) Date: Feb. 17, 2016

(87) PCT Pub. No.: WO2015/029960
PCT Pub. Date: Mar. 5, 2015

(65) Prior Publication Data
US 2016/0200964 A1 Jul. 14, 2016

(30) Foreign Application Priority Data
Aug. 30, 2013 (JP) ................................. 2013-180726

(51) Int. Cl.
| | | |
|---|---|---|
| *C08B 15/02* | (2006.01) | |
| *C09K 8/92* | (2006.01) | |
| *C09K 8/588* | (2006.01) | |
| *C08B 15/04* | (2006.01) | |
| *C09K 8/035* | (2006.01) | |

(52) U.S. Cl.
CPC ............. *C08B 15/02* (2013.01); *C08B 15/04* (2013.01); *C09K 8/035* (2013.01); *C09K 8/588* (2013.01); *C09K 8/92* (2013.01); *C09K 2208/08* (2013.01); *C09K 2208/10* (2013.01)

(58) Field of Classification Search
CPC ............ C09K 2208/08; C09K 2208/10; C09K 8/035; C09K 8/588; C08L 1/02; C08L 1/04; C08L 2205/16; C08J 2301/02; D21H 11/18; C08B 15/02; C08B 15/04

USPC ...................... 428/401; 536/56–101; 504/204
See application file for complete search history.

(56) References Cited

U.S. PATENT DOCUMENTS

| | | | | |
|---|---|---|---|---|
| 9,803,128 | B2 * | 10/2017 | Goi ........................ | C09K 8/035 |
| 2012/0237761 | A1 * | 9/2012 | Mukai ....................... | C08J 5/18 |
| | | | | 428/323 |
| 2012/0308624 | A1 * | 12/2012 | Isogai .................... | A61K 8/027 |
| | | | | 424/401 |
| 2013/0035263 | A1 | 2/2013 | Laukkanen et al. | |
| 2013/0269898 | A1 * | 10/2013 | Shirao ..................... | D21F 9/00 |
| | | | | 162/375 |

FOREIGN PATENT DOCUMENTS

| | | |
|---|---|---|
| CN | 101240035 | 8/2008 |
| CN | 102803431 | 11/2012 |
| JP | 62-15278 | 1/1987 |
| JP | 2-104896 | 4/1990 |
| JP | 2-272191 | 11/1990 |
| JP | 2005-290390 | 10/2005 |
| JP | 4874572 | 2/2012 |
| JP | 2012087256 A * | 5/2012 |

OTHER PUBLICATIONS

International Search Report dated Nov. 4, 2014 in application No. PCT/JP2014/072211.
Office Action dated Dec. 18, 2017 in Chinese Application No. 201480046890.8, with English translation.
Notification of Reasons for Refusal dated Jul. 31, 2018 in Japanese Patent Application No. 2015-534207, with English Translation.

* cited by examiner

*Primary Examiner* — Camie S Thompson
(74) *Attorney, Agent, or Firm* — Wenderoth, Lind & Ponack, L.L.P.

(57) ABSTRACT

To provide an additive for crude oil recovery, used in secondary/tertiary recovery of crude oil, which has high heat resistance and high mechanical shear resistance, of which the viscous property does not degrade even under high-temperature and high-shear conditions; has high pseudoplastic flowability and therefore has a light transfer workload; and is a naturally-derived one and is therefore highly biodegradable and has least adverse impact on environment. An additive for crude oil recovery, which contains cellulose fibers having a number-average fiber diameter of from 2 to 500 nm and a fiber aspect ratio of 50 or more and having a cellulose I-type crystal structure, and, in the cellulose fibers, a hydroxyl group on a surface of the cellulose fibers is preferably chemically modified.

3 Claims, No Drawings

CRUDE OIL RECOVERY ADDITIVE

TECHNICAL FIELD

The present invention relates to a novel additive for crude oil recovery that is used for secondary/tertiary recovery of crude oil. More precisely, the present invention relates to an additive for crude oil recovery, which has high heat resistance and high mechanical shear resistance, of which the viscous property does not degrade even under high-temperature and high-shear conditions; which has high pseudoplastic flowability and therefore has a light transfer workload; and which is a naturally-derived one and is therefore highly biodegradable and has least adverse impact on environment.

BACKGROUND ART

In increasing production of crude oil, a secondary/tertiary recovery process is used for the oil layer from which crude oil could not be collected according to a primary recovery process. The secondary/tertiary recovery process includes polymer flooding, micellar polymer flooding, etc. These flooding techniques are based on a principle of injecting a special aqueous polymer solution into an oily layer to extrude the residual oil, and further development thereof is strongly desired for increasing production of crude oil. The polymer to be used in these flooding techniques includes synthetic polymers such as acrylamide, etc.; natural polysaccharides and their derivatives such as xanthan gum, carboxymethyl cellulose and others (for example, Patent Literatures 1 to 4).

RELATED ART

Patent Literature

Patent Literature 1: JP-A-62-15278
Patent Literature 2: JP-A-2-104896
Patent Literature 3: JP-A-2-272191
Patent Literature 4: JP-A-2005-290390

SUMMARY OF INVENTION

Technical Problem

For increasing the recovery efficiency, it is necessary to inject a liquid that is as highly viscous as possible. However, in case of being too highly viscous, a problem that it could hardly be transferred may be caused. Further, the above-mentioned water-soluble polymers, when they are exposed to high temperatures of from 30 to 90° C. or given a mechanical shear during injection into an oily layer, may cause deterioration in the viscous property, leading to a lowering of the petroleum recovery rate. In addition, in case of synthetic polymers such as acrylamide, there is a problem that when remained in the ground, a great environmental load may be provided.

Solution to Problem

The inventors of the present invention have intensively studied for obtaining an additive for crude oil recovery, which has high heat resistance and high mechanical shear resistance, of which the viscous property does not degrade even under high-temperature and high-shear conditions; which has high pseudoplastic flowability and therefore has a light transfer workload; and which is a naturally-derived one and is therefore highly biodegradable and has least adverse impact on environment. During the process of the studies, the inventors took particular note of cellulose fibers having a number-average fiber diameter of from 2 to 500 nm and a fiber aspect ratio of 50 or more and having a cellulose I-type crystal structure. With that, they have found that an additive for crude oil recovery which contains the cellulose fibers can solve the given problems, and have reached the present invention.

Namely, the first gist of the present invention is an additive for crude oil recovery, which contains cellulose fibers having a number-average fiber diameter of from 2 to 500 nm and a fiber aspect ratio of 50 or more and having a cellulose I-type crystal structure.

It is preferable that, in the cellulose fibers, a hydroxyl group on a surface of the cellulose fibers has been chemically modified.

Additionally, the cellulose fibers are preferably cellulose fibers in which a hydroxyl group at C6-position in each glucose unit in their molecules has been selectively modified through oxidation into any of an aldehyde group, a ketone group and a carboxyl group, and a content of the carboxyl group falls within a range of from 1.2 to 2.5 mmol/g.

Furthermore, it is preferable that a total content of the aldehyde group and the ketone group in the cellulose fibers is measured as 0.3 mmol/g or less according to a semicarbazide method.

Additionally, it is preferable that the cellulose fibers have been oxidized with a co-oxidizing agent in the presence of an N-oxyl compound and the aldehyde group and the ketone group formed through the oxidation reaction have been reduced with a reducing agent.

Additionally, it is preferable that the reduction with the reducing agent is carried out by sodium borohydride.

The second gist of the present invention is a composition for crude oil recovery, which uses the additive for crude oil recovery.

Advantageous Effects of Invention

The additive for crude oil recovery of the present invention contains specific cellulose fibers, and therefore exhibits the advantageous effects that the heat resistance and the mechanical shear resistance are high; that the viscous property does not degrade even under high-temperature and high-shear conditions; and that the pseudoplastic flowability is high and therefore the transfer workload is light. This is because the cellulose fibers have a specific number-average fiber diameter and a specific aspect ratio, and several tens of cellulose molecules, as bundled, form a rigid crystal structure thereinside. In addition, the cellulose fibers are naturally-derived substances and are therefore highly biodegradable, and have an effect that the impact on environment is small.

DESCRIPTION OF EMBODIMENTS

Next, embodiments of the present invention are described in detail.

The additive for crude oil recovery of the present invention contains cellulose fibers having a number-average fiber diameter of from 2 to 500 nm and a fiber aspect ratio of 50 or more and having a cellulose I-type crystal structure.

The number-average fiber diameter of the cellulose fibers is from 2 to 500 nm. From the viewpoint of the dispersion stability thereof, it is preferably from 2 to 150 nm, more preferably from 2 to 100 nm, particularly preferably from 3 to 80 nm. When the number-average fiber diameter is too small, then the fibers substantially dissolve in a dispersion medium; while when the number-average fiber diameter is too large, the cellulose fibers flocculate and therefore could not express the functionality of incorporation of the cellulose fibers.

The maximum fiber diameter of the cellulose fibers is preferably 1000 nm or less, more preferably 500 nm or less. When the maximum fiber diameter of the cellulose fibers is too large, then the cellulose fibers may flocculate and the expression of the functionality of the cellulose fibers may tend to lower.

The number-average fiber diameter and the maximum fiber diameter of the cellulose fibers may be measured, for example, as follows. Namely, an aqueous dispersion of fine cellulose having a solid content fraction of from 0.05 to 0.1% by weight is prepared, and the dispersion is cast onto a hydrophilization-treated carbon film-coated grid to be a sample for observation with a transmission electron microscope (TEM). In a case of containing fibers having a large fiber diameter, the scanning electron microscopic (SEM) image of the surface thereof cast on glass may be observed. Depending on the size of the constitutive fibers, an observation is conducted with the electron microscope images at any magnifications of 5000 times, 10000 times or 50000 times. On this occasion, an axis of the image width in any of the lengthwise direction and the crosswise direction is simulated on the obtained image, and the sample and the observation conditions (magnification, etc.) are adjusted in such a manner that 20 or more fibers could cross that axis. With that, after the observation images satisfying the requirement are obtained, random two axes in the lengthwise direction and in the crosswise direction per every one image are drawn on the images, and the fiber diameter of the fibers intersecting with the axes is read visually. In that manner, at least three images of non-overlapping surface parts are photographed through an electron microscope, and the value of the fiber diameter of the fibers intersecting with the two axes is read. (Consequently, there is obtained information of fiber diameters of at least 20 fibers×2×3=120 fibers.) Based on the thus-obtained fiber diameter data, the maximum fiber diameter and the number-average fiber diameter are calculated.

The aspect ratio of the cellulose fibers is 50 or more, and is preferably 100 or more, more preferably 200 or more. When the aspect ratio is less than 50, then a sufficient pseudoplastic flowability as a composition for crude oil recovery might not be obtained.

The aspect ratio of the cellulose fibers can be measured, for example, according to the following method. Namely, cellulose fibers are cast onto a hydrophilization-treated carbon film-coated grid and negatively stained with 2% uranyl acetate. On the TEM image (magnifications: 10000 times) thereof, the number-average fiber diameter and the fiber length of the cellulose fibers are observed. Namely, according to the above-mentioned method, the number-average fiber diameter and the fiber length are calculated, and by using these values, the aspect ratio is calculated according to the following formula (1).

[Math. 1]

$$\text{Aspect Ratio} = \text{number-average fiber length (nm)} / \text{number-average fiber diameter (nm)} \quad (1)$$

The cellulose fibers are fibers obtained by pulverizing a naturally-derived cellulose solid material having a I-type crystal structure. Specifically, in a process of biosynthesis of natural cellulose, nanofibers called microfibrils are first formed almost with no exception, and these are bundled to constitute a high-order solid structure. Here, the cellulose constituting the cellulose fibers has a I-type crystal structure, and this may be identified, for example, from a diffraction profile in wide-angle X-ray diffraction image, in which there appear typical peaks at two positions near $2\theta=14$ to $17°$ and $2\theta=22$ to $23°$.

The cellulose fibers may be produced according to a known method, specifically as mentioned below.

For example, it can be obtained by suspending natural cellulose in water, and pulverizing this through treatment with a high-pressure homogenizer, a grinder or the like.

The natural cellulose is not specifically defined as long as it is vegetable, animal or microbe-derived cellulose. Examples thereof include softwood or hardwood-derived kraft pulp or dissolving pulp, cotton linter, lignocellulose having a low cellulose purity, wood powder, herbaceous cellulose, bacterial cellulose, etc.

As the cellulose fibers, bacterial cellulose produced by bacteria can be used. The bacteria include those of genus *Acetobacter*, more specifically *Acetobacter aceti, Acetobacter subsp., Acetobacter xylinum*, etc. By culturing these bacteria, cellulose is obtained by the bacteria. The obtained product contains the bacteria and the cellulose fibers (bacterial cellulose) which are produced by the bacteria and bound to the bacteria. Therefore, the product is taken out of the culture medium, washed with water or processed with alkali to remove the bacteria, by which water-containing bacterial cellulose which does not contain bacteria can be obtained.

Preferably, in the cellulose fibers, the hydroxyl group on the cellulose fiber surface is chemically modified. Specifically, the chemically-modified cellulose includes oxidized cellulose, carboxymethyl cellulose, polycarboxymethyl cellulose, long-chain carboxy cellulose, primary aminocellulose, cationized cellulose, secondary aminocellulose, methyl cellulose, and long-chain alkyl cellulose. Of those, oxidized cellulose is preferable since the selectivity to the hydroxyl group in the fiber surface is excellent and since the reaction condition is mild. Of the chemically-modified cellulose fibers, those dispersed in water in the form of a salt thereof, when formed as a salt with a polyvalent ion, may have a rigid network structure formed through crosslinking, and thereby an improvement in water-stop performance in use as an additive for crude oil recovery can be expected.

Oxidized cellulose can be obtained according to a production method which includes an oxidation reaction step of preparing a natural cellulose as a starting material and oxidizing the natural cellulose through reaction with a co-oxidizing agent in the presence of an N-oxyl compound as an oxidation catalyst in water to give a reaction product of fibers; a purifying step of removing impurities to give a water-infiltrated reaction product of fibers; and a dispersing step of dispersing the water-infiltrated reaction product of fibers in a solvent.

Preferably, in the cellulose fibers, the C6-positioned hydroxyl group in each glucose unit in the cellulose molecule is selectively modified through oxidation into any of an aldehyde group, a ketone group and a carboxyl group. Preferably, the content of the carboxyl group (carboxyl group content) falls within a range of from 1.2 to 2.5 mmol/g, more preferably within a range of from 1.5 to 2.0 mmol/g. When the carboxyl group content is too small, then the cellulose fibers may flocculate or aggregate; while when the carboxyl group content is too large, then the solubility in water may increase too much.

The measurement of the carboxyl group content in the cellulose fibers is, for example, as follows. From a cellulose sample, of which the dry weight is measured accurately, 60 ml of a 0.5 to 1 wt. % slurry is prepared, and the pH thereof is made to be about 2.5 with an aqueous 0.1 M hydrochloric acid solution, followed by dropwise adding aqueous 0.05 M sodium hydroxide solution thereto for electroconductivity measurement. The measurement is continued until the pH could reach about 11. From the amount of sodium hydroxide (V) having been consumed during the neutralization step with a weak acid to provide gentle change in electroconductivity, the carboxyl group content can be calculated according to the following formula (2).

[Math. 2]

$$\text{Carboxyl group content (mmol/g)} = V \text{ (ml)} \times [0.05/\text{cellulose weight}] \quad (2)$$

The carboxyl group content may be controlled, as described below, by controlling the added amount of the co-oxidizing agent to be used in the oxidation step for cellulose fibers and the reaction time therein.

Preferably, the cellulose fibers are reduced with a reducing agent after the modification through oxidation. As a result, a part or all of the aldehyde group and the ketone group may be reduced back to a hydroxyl group. However, the carboxyl group is not reduced. Accordingly, by the reduction, it is preferable that the total content of the aldehyde group and the ketone group in the cellulose fibers, in measurement according to a semicarbazide method, is 0.3 mmol/g or less, particularly preferably within a range of from 0 to 0.1 mmol/g, and most preferably, it is substantially 0 mmol/g. Consequently, the dispersion stability increases more in comparison with one which have been modified through mere oxidation, and in particular, excellent dispersion stability can be expressed for a long period of time without influenced by ambient temperature, etc.

Preferably, the cellulose fibers are oxidized with a co-oxidizing agent in the presence of an N-oxyl compound such as 2,2,6,6-tetramethylpiperidine (TEMPO) or the like, in which the aldehyde group and the ketone group formed through the oxidation reaction are reduced with a reducing agent, since the cellulose fibers can be obtained easily. When the reduction with the reducing agent is conducted by sodium borohydride ($NaBH_4$), it is more preferable from the above-mentioned viewpoint.

The total content of the aldehyde group and the ketone group can be measured according to a semicarbazide method, for example, as follows. Namely, accurately 50 ml of an aqueous 3 g/L semicarbazide hydrochloride solution adjusted to have pH=5 with a phosphate buffer is added to a dried sample and sealed up, followed by shaking for 2 days. Next, 10 ml of the solution is accurately put into a 100-ml beaker and 25 ml of 5 N sulfuric acid and 5 ml of an aqueous 0.05 N potassium iodate solution are added thereto, followed by stirring for 10 minutes. Subsequently, 10 ml of an aqueous 5% potassium iodide solution is added thereto, and immediately, with using an automatic titrator, titration with a 0.1 N sodium thiosulfate solution is carried out. From the titration amount etc., the carbonyl group content (total content of aldehyde group and ketone group) in the sample can be calculated according to the following formula (3). Since semicarbazide reacts with an aldehyde group and a ketone group to form a Schiff base (imine), but does not react with a carboxyl group, it is considered that only the aldehyde group and the ketone group can be quantified according to the above-mentioned measurement.

[Math. 3]

$$\text{Carbonyl group content (mmol/g)} = (D-B) \times f \times [0.125/w] \quad (3)$$

D: sample titer (ml)
B: blank test titer (ml)
f: factor of 0.1 N sodium thiosulfate solution (−)
w: sample amount (g)

In the cellulose fibers, only the C6-positioned hydroxyl group in each glucose unit in the cellulose molecule on the fiber surface is selectively modified through oxidation into any of an aldehyde group, a ketone group and a carboxyl group. Whether only the C6-positioned hydroxyl group in the glucose unit on the cellulose fiber surface has been selectively oxidized or not can be confirmed, for example, by the $^{13}$C-NMR chart. Specifically, the peak at 62 ppm corresponding to the C6-position of the primary hydroxyl group in the glucose unit, which can be confirmed on the $^{13}$C-NMR chart of cellulose before oxidation, disappears after oxidation reaction, and in place of it, a peak assigned to a carboxyl group or the like (the peak at 178 ppm is assigned to a carboxyl group) appears. In that manner, it can be confirmed that only the C6-positioned hydroxyl group in the glucose unit has been oxidized into a carboxyl group or the like.

The aldehyde group in the cellulose fibers can also be detected, for example, with a Fehling's reagent. Namely, for example, a Fehling's reagent (mixed solution of sodium potassium tartrate and sodium hydroxide, and aqueous solution of copper sulfate pentahydrate) is added to a dried sample, followed by heating at 80° C. for 1 hour. It is judged that, in the samples in which the supernatant is blue and the cellulose fiber fraction is dark blue, no aldehyde group is detected, while that, in the samples in which the supernatant is yellow and the cellulose fiber fraction is red, an aldehyde group is detected.

Preferably, the cellulose fibers are produced in a process including (1) an oxidation step, (2) a reduction step, (3) a purification step, (4) a dispersion step (pulverization step), etc. Specifically, it is desirable that the fibers are produced according to the following steps.

(1) Oxidation Step

A natural cellulose and an N-oxyl compound are dispersed in water (dispersion medium), and then a co-oxidizing agent is added thereto to start the reaction. During the reaction, pH is kept from 10 to 11 by dropwise adding thereto an aqueous 0.5 M sodium hydroxide solution, and at the time at which no pH change is detected, the reaction is considered to be terminated. Here, the co-oxidizing agent is not a substance to directly oxidize the cellulose hydroxyl group but is a substance to oxidize the N-oxyl compound used as an oxidation catalyst.

The natural cellulose means a purified cellulose isolated from a cellulose biosynthesis system of plants, animals, bacteria-producing gels or the like. More specifically, there are mentioned softwood pulp, hardwood pulp, cotton pulp such as cotton linter, cotton lint or the like, non-wood pulp such as wheat straw pulp, bagasse pulp or the like, bacterial cellulose (BC), cellulose isolated from sea squirt, cellulose isolated from marine algae, etc. These may be used either singly or in combination of two or more kinds. Of those, softwood pulp, hardwood pulp, cotton pulp such as cotton linter, cotton lint or the like, non-wood pulp such as wheat straw pulp, bagasse pulp or the like are preferable. Preferably, the natural cellulose is subjected to a process for increasing the surface area such as beating, since the reaction efficiency thereof can be increased and the productivity can be thereby increased. As the natural cellulose, when those stored without being dried after isolation and purification (never-dried products) are used, the microfibril bundles thereof are in a state easy to swell. Therefore, it is preferable since the reaction efficiency can be increased and the number-average fiber diameter after pulverization treatment can be reduced.

The dispersion medium for the natural cellulose in the above-mentioned reaction is water. The natural cellulose concentration in the aqueous reaction solution may be any desired concentration so far as the reagent (natural cellulose) can be dispersed enough therein. In general, it is about 5% or less relative to the weight of the aqueous reaction solution. However, by using an apparatus having a strong mechanical stirring power, the reaction concentration can be increased.

As the N-oxyl compound, for example, nitroxy radical-having compounds which are generally used as an oxidation catalyst are mentioned. As the N-oxyl compound, a water-soluble compound is preferable; piperidine nitroxy-oxyradical is more preferable; and 2,2,6,6-tetramethylpiperidinoxy radical (TEMPO) or 4-acetamide-TEMPO is especially preferable. A catalytic amount of the N-oxyl compound is enough to be added. Preferably, the compound is added to the aqueous reaction solution in an amount falling within a range of from 0.1 to 4 mmol/l, and more preferably from 0.2 to 2 mmol/l.

As the co-oxidizing agent, for example, hypohalous acids or their salts, halogenous acids or their salts, perhalic acids or their salts, hydrogen peroxide, perorganic acids, etc. are mentioned. These may be used either singly or in combination of two or more kinds. Above all, alkali metal hypohalites such as sodium hypochlorite, sodium hypobromite, etc. are preferable. In case where sodium hypochlorite is used, preferably, the reaction is carried out in the presence of an alkali metal bromide such as sodium bromide or the like, from the viewpoint of the reaction speed. The amount of the alkali metal bromide added is about from 1 to 40 times of molar amount and preferably about from 10 to 20 times of molar amount, in respect to the N-oxyl compound.

Preferably, the pH of the aqueous reaction solution is kept within a range of about from 8 to 11. The temperature of the aqueous solution may be any desired one, which is about 4 to 40° C. However, the reaction can be carried out at room temperature (25° C.), and the temperature control is not specifically needed. For obtaining the desired carboxyl group content and others, the oxidation degree is controlled by the amount of the co-oxidizing agent to be added and the reaction time. In general, the reaction time may be about from 5 to 120 minutes, and it is finished within at most 240 minutes.

(2) Reduction Step

Preferably, the cellulose fibers are subjected to a reduction reaction after the oxidation reaction. Specifically, the fine oxidized cellulose after the oxidation reaction is dispersed in pure water; the pH of the aqueous dispersion is controlled at about 10; and then a reduction reaction is carried out with various reducing agents. The reducing agents which can be used in the present invention may be any ordinary ones. $LiBH_4$, $NaBH_3CN$, $NaBH_4$, etc. are preferable. Above all, $NaBH_4$ is preferable from the viewpoint of the cost and the usability thereof.

The amount of the reducing agent is preferably within a range of from 0.1 to 4% by weight, based on the fine oxidized cellulose, more preferably within a range of from 1 to 3% by weight. The reaction is carried out at room temperature or at a temperature slightly higher than room temperature, generally for from 10 minutes to 10 hours, preferably for from 30 minutes to 2 hours.

After the termination of the reaction, the pH of the reaction mixture is controlled to be about 2 with various acids, and then while pure water is sprinkled thereover, the mixture is processed for solid-liquid separation with a centrifuge, thereby giving a cake-like fine oxidized cellulose. The solid-liquid separation is continued until the electroconductivity of the filtrate could reach 5 mS/m or less.

(3) Purification Step

Next, for removing the unreacted co-oxidizing agent (hypochlorous acid, etc.), various side-products and others, purification is conducted. In this stage, since the reaction product fibers are not always dispersed, in general, discretely to nanofiber units, the product is formed into an aqueous dispersion of the reaction product fibers in a high purity (99% by weight or more) and water, according to an ordinary purification method, namely, according to a process of repeated washing with water and filtration.

In the purification method of the purification step, any apparatus can be used as long as it is apparatus capable of attaining the above-mentioned object, as in a method of utilizing centrifugal dewatering (for example, using a continuous decanter). The aqueous dispersion of reaction product fibers thus obtained may have a solid (cellulose) concentration falling within a range of about from 10% by weight to 50% by weight in a squeezed state thereof. In consideration of the subsequent dispersion step, a high solid concentration of more than 50% by weight is unfavorable, since extremely high-level energy would be required for dispersion.

(4) Dispersion Step (Pulverization Treatment Step)

The water-infiltrated reaction product fibers (the aqueous dispersion) obtained in the above-mentioned purification step is dispersed in a dispersion medium by a dispersion treatment. With the treatment, the viscosity increases, and a dispersion of pulverization-treated cellulose fibers can be obtained. Subsequently, the cellulose fibers may be dried, if desired. As the drying method for the dispersion of cellulose fibers, for example, when the dispersion medium is water, a spray drying, a freeze drying method, a vacuum drying method, etc. can be used. When the dispersion medium is a mixed solution of water and an organic solvent, a drying method with a drum drier, a spray drying method with a spray drier, etc. can be used. Without being dried, the dispersion of cellulose fibers may be used as it is in the form of dispersion.

As the dispersing machine for use in the dispersion step, apparatus such as homomixers used in high-revolution, high-pressure homogenizers, ultra-high-pressure homogenizers, ultrasonic dispersers, beaters, disc refiners, conical refiners, double-disc refiners, grinders and the like that are powerful and have a beating ability are preferable, since they enable more efficient and high-level down-sizing and economically advantageously give the dispersion of pulverization-treated cellulose fibers, when they are used. As the dispersing machine, for example, screw mixers, paddle mixers, disperser mixers, turbine mixers, dispersers, propeller mixers, kneaders, blenders, homogenizers, ultrasonic homogenizers, colloid mills, pebble mills, bead mill grinders, etc. may be used. Two or more types of dispersing machines may also be used here as combined.

The composition for crude oil recovery that uses the additive for crude oil recovery of the present invention is an aqueous solution prepared by dispersing the above-mentioned cellulose fibers and other additives in water.

The content of the cellulose fibers in the composition for crude oil recovery of the present invention is not specifically limited and is preferably 0.01% by mass or more and 10.0% by mass or less, and more preferably 0.1% by mass or more and 2% by mass or less. When the content of the cellulose fibers is 0.01% by mass or more and 10% by mass or less, the composition for crude oil recovery can express good pseudoplastic flowability.

The oil layer suitable for conducting polymer flooding by using the composition for crude recovery is not specifically defined, and it may be a sandstone layer or a limestone oil layer having a permeability of 10 millidarcys or more. A layer with 50 millidarcys or more is preferable from the viewpoint of the permeability of the aqueous cellulose solution thereinto.

The composition for crude oil recovery may be used, optionally as combined with additives such as inorganic salts [metal [alkali metal (Na, K, etc.), alkaline earth metal (Ca, Mg, etc.), etc.] salts or ammonium salts of inorganic acids such as hydrochloric acid, sulfuric acid, nitric acid, phosphoric acid, carbonic acid, etc., for example, sodium carbonate, potassium carbonate, ammonium carbonate, sodium sulfate, ammonium sulfate, sodium hydrogensulfate, etc.], organic acids (salts) [organic acids such as carboxylic acids, sulfonic acids, phenols, etc., and their metal (as described above) salts or ammonium salts, for example, sulfamic acid, sodium acetate, sodium lactate, etc.], surfactants [surfactants described in U.S. Pat. No. 4,331,447, for example, polyoxyethylene nonylphenyl ether, sodium dioctylsulfosuccinate, etc.], antioxidants [phenolic compounds (hydroquinone, catechol, etc.), hindered amines [2-(5-methyl-2-hydroxyphenyl)benzotriazole, dimethyl succinate-1-(2-hydroxyethyl)-4-hydroxy-2,2,6,6-tetramethylpiperidine polycondensate, bis(1-octyloxy-2,2,6,6-tetramethyl-4-piperidyl) sebacate, etc.], sulfur-containing compounds [2-mercaptobenzothiazole and its salts (metal salts, ammonium salts, etc.), thiourea, tetramethylthiuram disulfide, dimethyldithiocarbamic acid and its salts (metal salts, ammonium salts, etc.), sodium sulfite, sodium thiosulfate, etc.], phosphorus-containing compounds (triphenyl phosphite, triethyl phosphite, sodium phosphite, sodium hypophosphite, etc.), nitrogen-containing compounds (guanidine sulfate, etc.)], etc.

As the amount of the additives to be used is, based on the mass of the cellulose fibers, the inorganic salt or the organic acid (salt) is generally 10% by mass or less; the surfactant is generally 5% by mass or less; and the antioxidant is generally 20% by mass or less. Preferably, the inorganic salt or the organic acid (salt) is from 0 to 5% by mass; the surfactant is from 0 to 3% by mass; and the antioxidant is from 0 to 10% by mass.

As the press fitting method (under pressure of from 100 to 5,000 psi) for the composition for crude oil recovery of the present invention into the ground, a known method (for example, JP-A-61-102995) can be used.

EXAMPLES

Next, Examples along with Comparative Examples are described. However, the present invention is not restricted to these Examples. Unless otherwise specifically indicated, "%" in Examples means that on a mass basis.
[Production of Cellulose Fibers]
[Production of Cellulose Fibers A1 (for Examples)]

In 4950 g of water, 50 g of bleached softwood kraft pulp (NBKP) was dispersed to prepare a dispersion solution having a pulp concentration of 1% by mass. The dispersion solution was processed 30 times with Cerendipiter MKCA6-3 (manufactured by Masuko Sangyo Co., Ltd.) to give cellulose fibers A1.
[Production of Cellulose Fibers A2 (for Examples)]

To 2 g of softwood pulp, 150 ml of water, 0.25 g of sodium bromide and 0.025 g of TEMPO were added, fully stirred and dispersed, and then an aqueous 13 wt % sodium hypochlorite solution (co-oxidizing agent) was added thereto so that the amount of sodium hypochlorite could be 5.2 mmol/g relative to 1.0 g of pulp to start the reaction. Since the pH lowered with the progression of reaction, an aqueous 0.5 N sodium hydroxide solution was dropwise added so as to keep the pH at from 10 to 11. The reaction was continued until no pH change was detected (reaction time: 120 minutes). After the reaction, 0.1 N hydrochloric acid was added for neutralization, which was then purified by repeating filtration and washing with water to give cellulose fibers oxidized on the surface thereof. Next, pure water was added to the cellulose fibers to dilute them to 1%, followed by processing once with a high-pressure homogenizer (manufactured by Sanwa Engineering, H11) under a pressure of 100 MPa to produce cellulose fibers A2.
[Production of Cellulose Fibers A3 (for Examples)]

Cellulose fibers A3 were produced in the same manner as the production for cellulose fibers A2, except that the added amount of the aqueous sodium hypochlorite solution was changed to 6.5 mmol/g per 1.0 g of the pulp.
[Production of Cellulose Fibers A4 (for Examples)]

Cellulose fibers A4 were produced in the same manner as the production for cellulose fibers A2, except that the added amount of the aqueous sodium hypochlorite solution was changed to 12.0 mmol/g per 1.0 g of the pulp.
[Production of Cellulose Fibers A5 (for Examples)]

Softwood pulp was oxidized according to the same method as the production for cellulose fibers A2 and then processed for solid-liquid separation with a centrifuge, and pure water was added thereto to control the solid concentration to be 4%. Subsequently, the slurry was controlled to have a pH of 10 with an aqueous 24% NaOH solution. The slurry temperature was made to be 30° C., and sodium borohydride was added thereto in an amount of 0.2 mmol/g relative to the cellulose fibers, followed by conducting a reaction for 2 hours for reducing treatment. After the reaction, 0.1 N hydrochloric acid was added for neutralization, then filtration and washing with water was repeated for purification to obtain cellulose fibers. Next, pure water was added to the cellulose fibers to dilute them to 1%, followed by processing once with a high-pressure homogenizer (manufactured by Sanwa Engineering, H11) under a pressure of 100 MPa to give cellulose fibers A5.
[Production of Cellulose Fibers A6 (for Examples)]

Softwood pulp was oxidized according to the same method as the production for cellulose fibers A3, and then reduced and purified according to the same method as the production for cellulose fibers A4. Next, pure water was added to the cellulose fibers to dilute them to 1%, followed by processing once with a high-pressure homogenizer (manufactured by Sanwa Engineering, H11) under a pressure of 100 MPa to give cellulose fibers A6.
[Production of Cellulose Fibers A7 (for Examples)]

Softwood pulp was oxidized according to the same method as the production for cellulose fibers A4, and then reduced and purified according to the same method as the production for cellulose fibers A4. Next, pure water was added to the cellulose fibers to dilute them to 1%, followed by processing once with a high-pressure homogenizer (manufactured by Sanwa Engineering, H11) under a pressure of 100 MPa to give cellulose fibers A7.

[Production of Cellulose Fibers A'1 (for Comparative Examples)]

In 4950 g of water, 50 g of bleached softwood kraft pulp (NBKP) was dispersed to prepare a dispersion solution having a pulp concentration of 1% by mass. The dispersion solution was treated 10 times with Cerendipiter MKCA6-3 (manufactured by Masuko Sangyo Co., Ltd.) to give cellulose fibers A'1.

[Production of Cellulose Fibers A'2 (for Comparative Examples)]

Cellulose fibers A'2 were produced in the same manner as the production for cellulose fibers A2 except that regenerated cellulose was used in place of the starting material softwood pulp and that the added amount of the aqueous sodium hypochlorite solution was changed to 27.0 mmol/g relative to 1.0 g of the regenerated cellulose.

The cellulose fibers produced in the manner as above were evaluated for the properties thereof according to the criteria mentioned below. The results are also shown in the following Table 1.

[Measurement of Carboxyl Group Content]

To prepare 60 ml of an aqueous cellulose dispersion, 0.25 g of cellulose fibers were dispersed in water and its pH was made to be about 2.5 with an aqueous 0.1 M hydrochloric acid solution. Then an aqueous 0.05 M sodium hydroxide solution was dropwise added thereto for electroconductivity measurement. The measurement was continued until the pH could reach 11. From the amount of sodium hydroxide (V) having been consumed during the neutralization step with a weak acid to provide gentle change in electroconductivity, the carboxyl group content was calculated according to the following formula (2).

[Math. 2]

$$\text{Carboxyl group content (mmol/g)} = V \text{ (ml)} \times [0.05/\text{cellulose weight}] \quad (2)$$

[Measurement of Carbonyl Group Content (Semicarbazide Method)]

About 0.2 g of the cellulose fibers were accurately weighed, and accurately 50 ml of an aqueous 3 g/L semicarbazide hydrochloride solution regulated to have pH=5

TABLE 1

| | for Examples | | | | | | | for Comparative Examples | |
|---|---|---|---|---|---|---|---|---|---|
| | A1 | A2 | A3 | A4 | A5 | A6 | A7 | A'1 | A'2 |
| Added amount of Sodium Hypochlorite [mmol/g] | — | 5.2 | 6.5 | 12 | 5.2 | 6.5 | 12 | — | 27 |
| Crystal Structure | present | present | present | present | present | present | present | present | absent |
| Number-Average Fiber Diameter [nm] | 250 | 89 | 54 | 11 | 58 | 23 | 4 | 800 | unmeasurable (not more than 1) |
| Aspect Ratio | 56 | 92 | 134 | 242 | 127 | 209 | 280 | 35 | unmeasurable |
| Carboxyl Group Content [mmol/g] | <0.1 | 1.2 | 1.6 | 2 | 1.2 | 1.6 | 2 | <0.1 | 3.1 |
| Carbonyl Group Content [mmol/g] | <0.1 | 0.37 | 0.43 | 0.42 | 0.14 | 0.23 | 0.3 | <0.1 | 0.59 |
| Detection of Aldehyde Group | not detected | detected | detected | detected | not detected | not detected | not detected | not detected | detected |

[Crystal Structure]

By using an X-ray diffractometer (manufactured by Rigaku, RINT-Ultima 3), the cellulose fibers were analyzed for the diffraction profile thereof. When typical peaks at two positions near $2\theta = 14$ to $17°$ and near $2\theta = 22$ to $23°$ were detected, a crystal structure (I-type crystal structure) was evaluated as "present"; while when the peaks were not detected, a crystal structure was evaluated as "absent".

[Measurement of Number-Average Fiber Diameter and Aspect Ratio]

The number-average fiber diameter and the fiber length of the cellulose fibers were observed with a transmission electron microscope (TEM) (manufactured by JEOL, JEM-1400). Namely, the cellulose fibers were cast on a hydrophilization-treated carbon film-coated grid and negatively stained with 2% uranyl acetate. On the TEM image (magnifications: 10000 times) thereof, the number-average fiber diameter and the fiber length were calculated according to the method mentioned above.

With using these values, the aspect ratio was calculated according to the following formula (1).

[Math. 1]

$$\text{Aspect Ratio} = \text{number-average fiber length (nm)}/\text{number-average fiber diameter (nm)} \quad (1)$$

with a phosphate buffer was added thereto and sealed up, followed by shaking for 2 days. Next, 10 ml of the solution was accurately put into a 100-ml beaker and 25 ml of 5 N sulfuric acid and 5 ml of an aqueous 0.05 N potassium iodate solution were added thereto, followed by stirring for 10 minutes. Subsequently, 10 ml of an aqueous 5% potassium iodide solution was added thereto, and immediately, with using an automatic titrator, titration was carried out with a 0.1 N sodium thiosulfate solution. From the titration amount, the carbonyl group content (total content of aldehyde group and ketone group) in the sample was calculated according to the following formula (3).

[Math. 3]

$$\text{Carbonyl group content (mmol/g)} = (D-B) \times f \times [0.125/w] \quad (3)$$

D: sample titer (ml)
B: blank test titer (ml)
f: factor of 0.1 N sodium thiosulfate solution (−)
w: sample amount (g)

[Detection of Aldehyde Group]

0.4 g of the cellulose fibers were accurately weighed, then a Fehling's reagent (5 ml of a mixed solution of sodium potassium tartrate and sodium hydroxide and 5 ml of aqueous copper sulfate pentahydrate solution) which was prepared according to Japanese pharmacopeia was added thereto, followed by heating at 80° C. for 1 hour. In the samples in which the supernatant was blue and the cellulose fiber fraction was dark blue, it was judged that no aldehyde group was detected, and they were evaluated as "not detected". In the samples in which the supernatant was yellow and the cellulose fiber fraction was red, it was judged that an aldehyde group was detected, and they were evaluated as "detected".

From the results in the above Table 1, the cellulose fibers A1 to A7 for Examples all had a number-average fiber diameter falling within a range of from 2 to 500 nm and had a cellulose I-type crystal structure. Further, in the cellulose fibers A2 to A7, the carboxyl group content fell within a range of from 1.2 to 2.5 mmol/g. As opposed to these, the cellulose fibers A'1 for Comparative Examples had a number-average fiber diameter larger than the upper limit, and the carboxyl group content therein was less than the lower limit. The number-average fiber diameter of the cellulose fibers A'2 was too small and was unmeasurable (not more than 1 nm), and the carboxyl group content therein was more than the upper limit.

In the cellulose fibers A2 and A7, as to whether or not only the C6-positioned hydroxyl group in the glucose unit on the cellulose fiber surface had been selectively oxidized into a carboxyl group or the like was confirmed by the $^{13}$C-NMR chart. As a result, the peak at 62 ppm corresponding to the C6-position of the primary hydroxyl group in the glucose unit, which can be confirmed on the $^{13}$C-NMR chart of the cellulose before oxidation, disappeared after oxidation reaction, and in place of it, a peak assigned to a carboxyl group appeared at 178 ppm. This confirmed that in all the cellulose fibers A2 to A7, only C6-positioned hydroxyl group in the glucose unit was oxidized into a carboxyl group or the like.

[Preparation of Test Liquids of Cellulose Fibers and Other Comparative Samples]

Test liquids of the above-mentioned cellulose fibers and other comparative samples were prepared according to the process mentioned below.

[Test Liquid 1]

Pure water, sodium chloride and calcium chloride were added to the cellulose fibers A1 obtained in the above, and by using a homomixer MARK II 2.5 Model (manufactured by PRIMIX), stirring was carried out at 4,000 rpm for 5 minutes to prepare 1,000 g of a test liquid having a cellulose fiber concentration of 0.4%, a sodium chloride concentration of 0.5% and a calcium chloride concentration of 0.1%.

[Test Liquids 1 to 9]

Test liquids were prepared according to the same method as that for the test liquid 1 except that the cellulose fibers A1 were changed to any of cellulose fibers A2 to A7, A'1 and A'2.

[Test Liquid 10]

Pure water, sodium chloride and calcium chloride were added to a commercially-available polyacrylamide (Telcoat DP, manufactured by Telnite), and by using a homomixer MARK II 2.5 Model (manufactured by PRIMIX), stirring was carried out at 4,000 rpm for 5 minutes to prepare 1,000 g of a test liquid having a polyacrylamide concentration of 0.4%, a sodium chloride concentration of 0.5% and a calcium chloride concentration of 0.1%.

[Test Liquid 11]

Pure water, sodium chloride and calcium chloride were added to a commercially-available xanthan gum (K-OB, manufactured by Dainippon Sumitomo Pharma), and by using a homomixer MARK II 2.5 Model (manufactured by PRIMIX), stirring was carried out at 4,000 rpm for 5 minutes to prepare 1,000 g of a test liquid having a xanthan gum concentration of 0.4%, a sodium chloride concentration of 0.5% and a calcium chloride concentration of 0.1%.

[Evaluation of Test Liquids]

By using the obtained test liquids, measurement of TI and evaluation of viscosity degradation were performed according to the evaluation methods mentioned below. The evaluation results are shown in Table 2 below.

TABLE 2

|  | Example 1 | Example 2 | Example 3 | Example 4 | Example 5 | Example 6 | Example 7 |
|---|---|---|---|---|---|---|---|
| Test liquid | 1 | 2 | 3 | 4 | 5 | 6 | 7 |
| Additive | A1 | A2 | A3 | A4 | A5 | A6 | A7 |
| Viscosity (6 rpm) | 4,620 | 4,330 | 4,510 | 4,780 | 4,660 | 5,270 | 5,830 |
| Viscosity Degradation | ○○ | ○ | ○ | ○ | ○○ | ○○ | ○○ |
| TI | Δ | ○ | ○ | ○ | ○○ | ○○ | ○○ |

|  | Comparative Example 1 | Comparative Example 2 | Comparative Example 3 | Comparative Example 4 |
|---|---|---|---|---|
| Test liquid | 8 | 9 | 10 | 11 |
| Additive | A'1 | A'2 | polyacrylamide | xanthan gum |
| Viscosity (6 rpm) | 780 | 200 | 4,820 | 3,240 |
| Viscosity Degradation | ○○ | x | x | x |
| TI | x | x | x | Δ |

[Measurement of Thixotropy Index (TI)]

At 25° C. for 1 day, 250 g of the obtained test liquid was statically kept, and then, by using a B-type viscometer (manufactured by BROOKFIELD, Rotor No. 4, 6 rpm, 3 minutes, 25° C.), the viscosity thereof was measured. Subsequently, the viscosity was measured under the same condition except that the rotation number was changed to 60 rpm.

From the viscosity obtained, TI was calculated according to the following formula (4).

[Math. 4]

$$TI = \text{viscosity (mPa·s) at a rotation number of 6 rpm} / \text{viscosity (mPa·s) at a rotation number of 60 rpm} \quad (4)$$

TI was evaluated according to the following criteria.

○○: 6 or more
○: 4 or more and less than 6
Δ: 3 or more and less than 4
x: less than 3

[Evaluation of Viscosity Degradation by Mechanical Shear at High Temperature]

At 25° C. for 1 day, 500 g of the obtained test liquid was statically left, and then, by using a B-type viscometer (manufactured by BROOKFIELD, Rotor No. 4, 6 rpm, 3 minutes, 25° C.), the viscosity thereof was measured. Subsequently, by using a water bath, the test liquid was heated up to 60° C., and while the temperature thereof was kept at 60° C., it was stirred at 12,000 rpm for 60 minutes with a homomixer MARK II 2.5 Model (manufactured by PRI-MIX). Subsequently, the processed liquid was further statically left at 25° C. for 1 day, and the viscosity thereof was measured with a B-type viscometer (manufactured by BROOKFIELD Rotor No. 4, 6 rpm, 3 minutes, 25° C.).

From the viscosity before and after shear treatment, the viscosity retention rate (%) was calculated according to the following formula (5), and the degree of viscosity degradation was thereby evaluated.

[Math. 5]

Viscosity Retention Rate (%)=viscosity (mPa·s) after shear treatment/viscosity (mPa·s) before shear treatment×100     (5)

The viscosity degradation was evaluated according to the following criteria.

OO: 85% or more
O: 70% or more and less than 85%
Δ: 55% or more and less than 70%
x: less than 55%

From Table 2, it is considered that, in comparison with the cellulose fibers A1 to A7 as the products of the present invention, the cellulose fibers A'1 having a small fiber aspect ratio have a lower TI value (Comparative Example 1), and when they are used in a composition for crude oil recovery, they could not exhibit sufficient pseudoplastic flowability. The cellulose fibers A'2 which do not have I-type crystal structure are poor in point of the viscosity degradation (Comparative Example 2), and therefore, when they are used in a composition for crude oil recovery, there is possibility that the viscosity would degrade under high-temperature and high-shear condition. In addition, from that the cellulose fibers A1 to A7 as the products of the present invention are excellent in point of viscosity degradation and TI, in comparison with polyacrylamide (Comparative Example 3) and xanthan gum (Comparative Example 4) which have heretofore been used as an additive for crude oil recovery, it becomes obvious that when they are used in a composition for crude oil recovery, they exhibit an excellent effect.

INDUSTRIAL APPLICABILITY

The additive for crude oil recovery of the present invention can be used in secondary/tertiary recovery of crude oil.

The invention claimed is:

1. A composition for crude oil recovery, which comprises
   (i) cellulose fibers having a number-average fiber diameter of from 2 to 500 nm and a fiber aspect ratio of 50 or more and having a cellulose I-type crystal structure,
   (ii) 0.1% by mass or more to 5.0% by mass or less of an alkaline earth metal salt additive, and optionally at least one additional additive selected from the group consisting of, 10% by mass or less of an organic acid salt, 5% by mass or less of a surfactant, and 20% by mass or less of an antioxidant, each based on the mass of the cellulose fibers, and
   (iii) water,
   wherein the content of the cellulose fibers in the composition is 0.01% by mass or more to 0.4% by mass or less,
   wherein the cellulose fibers are cellulose fibers in which a hydroxyl group at C6-position in each glucose unit in their molecules has been selectively modified through oxidation into a ketone group, and optionally in addition a carboxyl group, wherein the content of the carboxyl group falls within a range of from 1.2 to 2.5 mmol/g when present, and
   wherein the total content of the ketone group in the cellulose fibers is measured as 0.3 mmol/g or less according to a semicarbazide method.

2. The composition for crude oil recovery according to claim 1, wherein the cellulose fibers have been oxidized with a co-oxidizing agent in the presence of an N-oxyl compound and the ketone group formed through the oxidation reaction has been reduced with a reducing agent.

3. The composition for crude oil recovery according to claim 2, wherein the reduction with the reducing agent is carried out by sodium borohydride.

* * * * *